(12) United States Patent
Sathish (10) Patent No.: US 8,204,995 B2
(45) Date of Patent: Jun. 19, 2012

(54) MULTIDEVICE SESSION ESTABLISHMENT FOR MULTIMODAL BROWSING

(75) Inventor: Sailesh Sathish, Tampere (FI)

(73) Assignee: Nokia Corporation, Espoo (FI)

( * ) Notice: Subject to any disclaimer, the term of this patent is extended or adjusted under 35 U.S.C. 154(b) by 1172 days.

(21) Appl. No.: 11/171,857

(22) Filed: Jun. 29, 2005

(65) Prior Publication Data

US 2007/0005990 A1    Jan. 4, 2007

(51) Int. Cl.
*G06F 15/16* (2006.01)
*G06F 15/177* (2006.01)

(52) U.S. Cl. .................. 709/227; 709/220; 709/228

(58) Field of Classification Search ............... 709/227, 709/228, 220
See application file for complete search history.

(56) References Cited

U.S. PATENT DOCUMENTS

| | | | |
|---|---|---|---|
| 5,892,813 A | | 4/1999 | Morin et al. |
| 6,012,030 A | | 1/2000 | French-St. George et al. |
| 6,807,529 B2 * | | 10/2004 | Johnson et al. ............. 704/270.1 |
| 6,823,308 B2 | | 11/2004 | Keiller et al. |
| 6,868,383 B1 | | 3/2005 | Bangalore et al. |
| 7,433,956 B2 * | | 10/2008 | Zhao et al. .................... 709/228 |
| 7,490,125 B1 * | | 2/2009 | Jagadeesan et al. .......... 709/204 |
| 2002/0065944 A1 * | | 5/2002 | Hickey et al. ................. 709/310 |
| 2003/0126330 A1 * | | 7/2003 | Balasuriya .................... 710/107 |
| 2003/0167172 A1 | | 9/2003 | Johnson et al. |
| 2004/0143669 A1 | | 7/2004 | Zhao et al. |

OTHER PUBLICATIONS

International Search Report from International Application No. PCT/IB2006/001708, dated Mar. 6, 2007.
W3C, W3C Multimodal Interaction Framework, Retrieved from Internet Site http://www.w3.org/TR/mmi-framework/ on Jun. 2, 2005, pp. 1-23, W3C, (no admission that this constitutes prior art).
W3C, Multimodal Interaction Activity, Retrieved from Internet Site http://www.w3.org./2002/mmi/ on Jun. 2, 2005, pp. 1-7, W3C, (no admission that this constitutes prior art).
W3C, Multimodal Interaction Use Cases, Retrieved from Internet Site http://www.w3.org/TR/mmi-use-cases/ on Jun. 2, 2005, pp. 1-29, W3C, (no admission that this constitutes prior art).

* cited by examiner

*Primary Examiner* — Ario Etienne
*Assistant Examiner* — Hee Kim
(74) *Attorney, Agent, or Firm* — Ditthavong Mori & Steiner, P.C.

(57) ABSTRACT

Systems, methods, apparatuses and computer program products for establishing a single session for processing a multimodal application with multiple devices and for distributing the multimodal application amongst the multiple devices participating in the single session based on the respective capabilities of each device are provided. A system, method and computer program product for allowing new devices operated by the same user to join in the previously established session for processing the multimodal application where the capabilities of the new device exceed that of all devices currently participating in the session are also provided.

42 Claims, 8 Drawing Sheets

MULTIDEVICE SESSION ESTABLISHMENT FOR MULTIMODAL BROWSING

FIELD OF THE INVENTION

This invention relates to multimodal applications, and more particularly to a method of enabling multiple devices to participate in a single session for processing a multimodal application.

BACKGROUND OF THE INVENTION

Multimodal interaction allows users to dynamically select the most appropriate mode of interaction for their current needs. When processing a multimodal application (e.g., browsing a multimodal web site), depending upon the device operated by a user, he or she can provide input to the application via speech, handwriting, keystrokes, or other input modalities, with output presented via displays, pre-recorded and synthetic speech, audio, and/or tactile mechanisms such as mobile phone vibrators and Braille strips.

Figure 1:
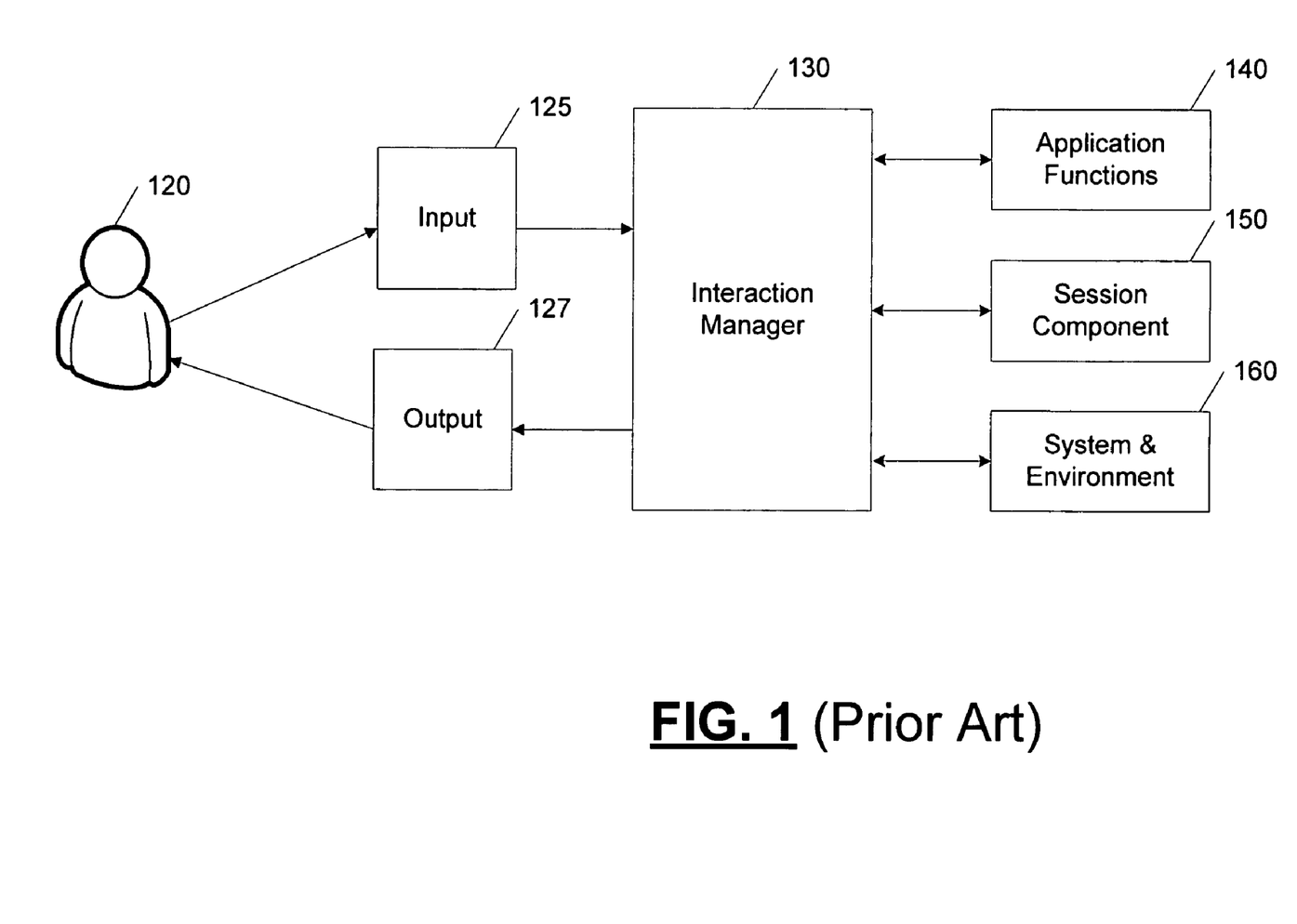
FIG. 1 illustrates the basic components of the W3C multimodal interaction framework.

FIG. 1 illustrates the basic components of a World Wide Web Consortium (W3C) multimodal interaction framework, which is described more fully in W3C Multimodal Interaction Framework, W3C NOTE 6 May 2003 available at http://www.w3.org/TR/mmi-framework/ and incorporated herein by reference in its entirety. As shown, a user 120 enters input into a multimodal system via an input component 125 using, for example, speech, handwriting, or keystrokes, and observes and/or hears output presented by the system via an output component 127, in the form of speech, text, graphics, audio files or animation.

An interaction manager 130 is responsible for coordinating data and managing execution flow from the various input and output modality components, as well as an Application Function 140, a Session Component 150 and a System and Environment Component 160. The Application Functions 140 provide the multimodal applications. The session component 150 provides an interface to the interaction manager to support state management and temporary and persistent sessions for multimodal applications, and the System and Environment component 160 enables the interaction manager to find out about and respond to changes in device capabilities, user preferences and environment conditions.

In general, sub-components of the input component 125 include a recognition component, an interpretation component and an integration component. The recognition component captures the natural input of the user and translates that input into a form useful for later processing. For example, where the input mode is handwriting, the recognition component will convert the user's handwritten symbols and messages into text by using, for example, a handwritten gesture model, a language model and a grammar. The interpretation component further processes the results of the recognition component by identifying the "meaning" or "semantics" intended by the user. Finally, the integration component combines the output from several interpretation components.

Similarly, sub-components of the output component 127 include a generation component, a styling component and a rendering component. The generation component determines which output mode(s) will be used for presenting information to the user. The styling component adds information about how the information is presented or "layed out," and the rendering component converts the output of the styling component into a format that the user can easily understand. Any one or all of the sub-components of the input and output components 125, 127 may reside on the user's device, or on a network, such as a Local Area Network (LAN), Wide Area Network (WAN), or the Internet. The user's device may include any computing device including, for example, a mobile telephone, personal data assistant (PDA), laptop or mobile personal computer (PC), desktop unit, or workstation.

What if a user has more than one device, each having limited, but different, modality capabilities? For instance, he or she may have a PDA that acts as a vision browser able to receive input in the form of handwriting or keystrokes, and to produce output in the form of text or graphics, but is not capable of receiving or producing speech input or output. However, the user has a separate device, such as a mobile telephone or an electronic amulet the user can wear around his or her neck, that is, capable of processing an application using speech inputs and outputs. It would be desirable for the user to be able to use both (or all) of his or her devices when processing a multimodal application in order to have composite capabilities exceeding the capabilities of any one of the devices used on their own. A need therefore exists for a means for enabling a user to process a multimodal application using multiple devices having varying capabilities.

BRIEF SUMMARY OF THE INVENTION

Generally described, various embodiments of the present invention provide an improvement over the known prior art by allowing multiple devices operated by the same user to take part in a single session for processing a multimodal application, thus enhancing the capabilities of each device when operated on its own. In particular, the embodiments of the present invention provide systems, methods, apparatuses and computer program products for establishing the session and distributing the multimodal application amongst the multiple devices participating in the session based on the respective capabilities of each device and on user preferences. Finally, embodiments of the present invention provide a system, method and computer program product for allowing a new device operated by the same user to join in the previously established session for processing the multimodal application where either the capabilities of the new device exceed that of all devices currently participating in the session, or the user indicates, either directly or through user preferences associated with the devices, a desire to allow the new device to join.

According to one aspect of the present invention a method of establishing a single session for processing a multimodal application with multiple devices operated by a user is provided. In one embodiment, the method includes the steps of (1) receiving a request to establish a session for processing a multimodal application from each of one or more devices; (2) determining whether the one or more devices are operated by the user; (3) generating a unique session identification (ID) for the single session; and (4) transmitting the unique session ID to those devices operated by the user.

According to another aspect of the present invention a method of distributing at least part of a multimodal application amongst multiple devices operated by a user and participating in a single session for processing the multimodal application is provided. In various embodiments of the invention the single session has a composite capability profile associated with it that includes a compilation of one or more capabilities associated with each of the multiple devices. One embodiment of the method includes the following steps: (1) receiving a request for the multimodal application from one of the multiple devices; (2) receiving the multimodal application in response to the request, wherein the multimodal application includes one or more requirements for each of one or more modalities used in association with the multimodal application; (3) determining which of the multiple devices is capable of using each of the one or more modalities in association with the multimodal application based at least in part on the one or more requirements and the composite capability profile; and (4) distributing at least part of the multimodal application to the multiple devices based on a determination of which of the multiple devices is capable of using each of the one or more modalities.

According to yet another aspect of the present invention a method of allowing a new device to join in a previously established single session for processing a multimodal application with one or more current devices operated by a user is provided, wherein the previously established single session has a composite capability profile based on a combination of one or more capabilities of the one or more current devices. In one embodiment, the method includes the following steps: (1) receiving a request to establish a session for processing a multimodal application from the new device, wherein the request includes a multimodal profile associated with the new device including one or more capabilities of the new device; (2) determining whether the new device is operated by the user; (3) determining whether the new device should process the multimodal application based on the one or more capabilities of the new device; and (4) establishing a new session with the one or more current devices and the new device upon a determination that the new device is operated by the user and that the one or more capabilities of the new device exceed the composite capability profile of the previously established single session.

According to yet another aspect of the present invention a system for establishing a single session for processing a multimodal application with multiple devices operated by a user is provided, wherein the multimodal application includes one or more requirements for using one or more modalities in association with it. In one embodiment, the system includes an interaction manager, a profile manager, and a unique identification (ID) generator.

According to another aspect of the present invention, an interaction manager used to manage a single session for processing a multimodal application with multiple devices and to distribute at least part of the multimodal application to each of the multiple devices is provided.

According to yet another aspect of the present invention, a profile manager module for creating and storing a composite capability profile associated with a single session for processing a multimodal application with multiple devices is provided.

According to other aspects of the present invention, computer program products for (1) establishing a single session for processing a multimodal application with multiple devices operated by a user; (2) distributing at least part of a multimodal application amongst multiple devices operated by a user and participating in a single session for processing the multimodal application; and (3) allowing a new device to join in a previously established single session for processing a multimodal application with one or more current devices operated by a user are provided.

Finally, according to yet another aspect of the present invention, a method of conducting a single session for processing a multimodal application with multiple devices operated by a user is provided. In one embodiment, the method includes the steps of: (1) establishing a single session with the multiple devices; (2) distributing at least part of the multimodal application to the multiple devices based at least in part on one or more capabilities of each of the multiple devices; and (3) processing the multimodal application using the multiple devices.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully with reference to the accompanying drawings, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

As will be appreciated by one skilled in the art, the present invention may be embodied as a method, a system, a device or other apparatus, or a computer program product. Accordingly, the present invention may take the form of an entirely hardware embodiment, an entirely software embodiment, or an embodiment combining software and hardware aspects. Furthermore, the present invention may take the form of a computer program product on a computer-readable storage medium having computer-readable program instructions (e.g., computer software) embodied in the storage medium. More particularly, the present invention may take the form of web-implemented computer software. Any suitable computer-readable storage medium may be utilized including hard disks, CD-ROMs, optical storage devices, or magnetic storage devices.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Overview

Embodiments of the present invention permit multiple devices operated by the same user and having different capabilities to participate in a single session for processing a multimodal application. Each device participating in the session contributes a different modality to the session—i.e., each device receives and provides information to the application using different input and output modalities, such as speech, handwriting, keystrokes, etc.—based on the capabilities of that device and on the user's preferences. By allowing multiple devices to participate in the same session one can use the capabilities of the multiple devices to enhance the capability of the current, or master, device.

For example, consider the scenario in which a user is sitting in his or her car and using a personal digital assistant (PDA) to browse a multimodal web site. While the multimodal web site is capable of receiving input and providing output in the form of speech (and presumably other modalities), the PDA, which is the user's master device, does not include a speech recognizer, and, therefore, is not capable of receiving input or providing output in the form of speech. However, the user is also wearing an electronic amulet that does include a speech recognizer. According to embodiments of the present invention, a single session can be established between the PDA and the electronic amulet, such that the user can browse the multimodal web site using voice prompts and answers through the amulet and/or handwriting or keystrokes through the PDA. Having the electronic amulet in the vicinity of the PDA, therefore, makes the PDA speech enabled for that particular application.

Now assume that the user has arrived at his office and wishes to continue browsing the multimodal web site in his or her office where he or she has access to a network-based speech recognizer having improved capabilities over the electronic amulet. For instance, the electronic amulet may hold a speech recognizer that can only process roughly 1000 words, while the network-based speech recognizer can process thousands of words. According to the present invention, once the network-based speech recognizer has made its presence in the vicinity of the multimodal interaction known, as well as its capabilities, the current session between the amulet and the PDA will be terminated (assuming this is the user's preference) and a new session will be established with the network-based speech recognizer. By establishing a new session with the high-end speech recognizer, the user can more freely use natural language when responding to various prompts given by the multimodal application, since the speech recognizer is able to process more words.

System Architecture

Figure 2:
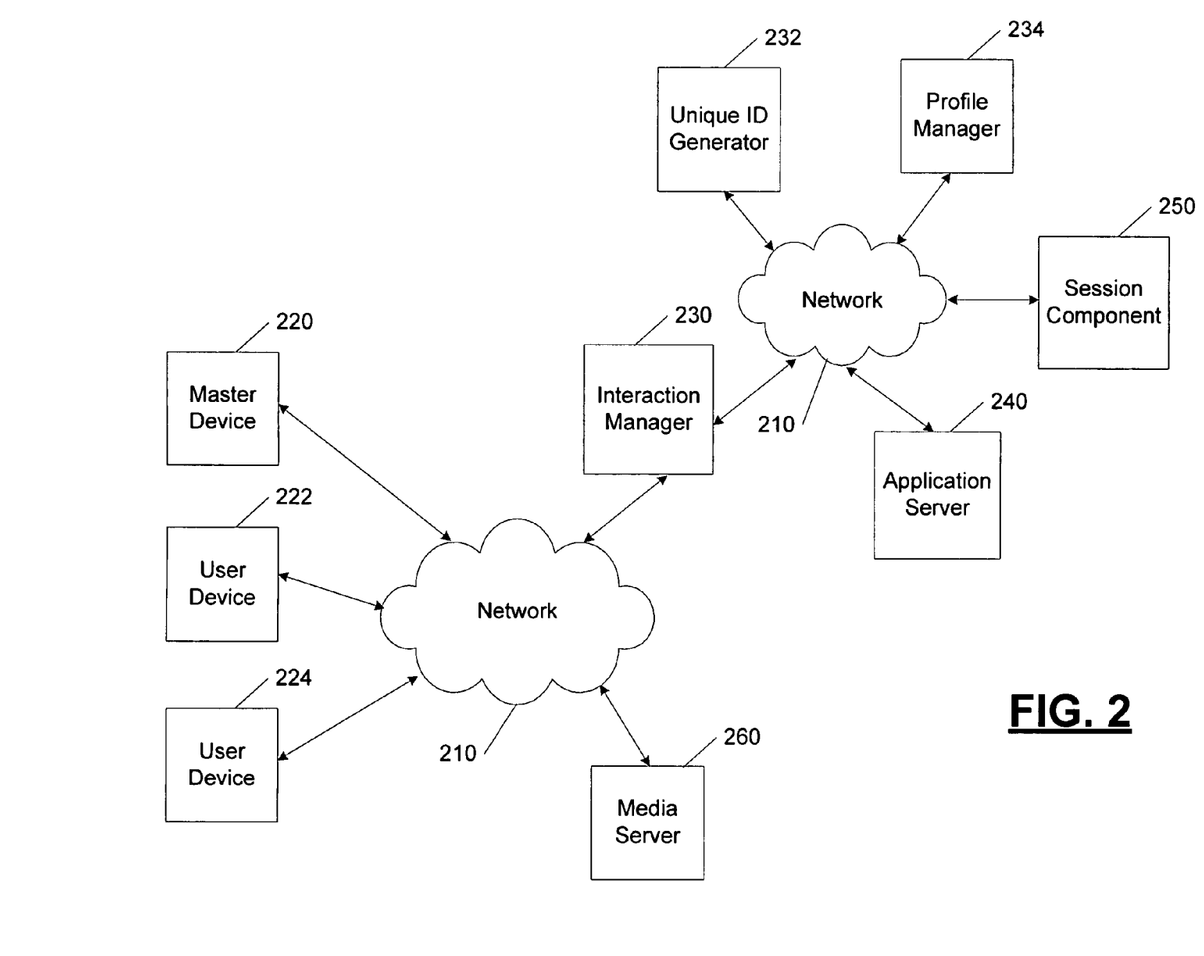
FIG. 2 is a block diagram of a system for providing a single session for processing a multimodal application in accordance with one embodiment of the present invention.

FIG. 2 is a block diagram of a system for providing a single session for processing a multimodal application in accordance with various embodiments of the present invention. As described more fully below, providing the session for processing a multimodal application using multiple devices involves establishing the session with the devices using a unique session ID, combining the capabilities of each of the devices in order to determine the composite capability of the devices for that session, and distributing the multimodal application amongst the devices based on the requirements necessary for using each of a plurality of modalities in association with the application and on the respective capabilities and user preferences of each device.

As may be understood from FIG. 2, the system may include a Master Device 220 and one or more additional User Devices 222, 224 that are connected, via a network 210 (e.g., a Local Area Network (LAN), wide area network (WAN), or the Internet), to an Interaction Manager 230 and a Media Server 260. As stated above, the Master and User Devices 220, 222, 224 may be any number of electronic devices including, but not limited to, PDAs, mobile telephones, mobile PCs or desktop units, televisions, amulets, or other pure input/output devices. The Interaction Manager 230, which is described in more detail below, in turn is connected via the network 210 to a Unique ID Generator 232, Profile Manager 234, Session Component 250 and Application Server 240.

In the embodiment shown in FIG. 2, the Interaction Manager 230 is a separate device, or a software module implemented on a separate device, connected to the Master Device 220 and User Devices 222, 224, via the network 210. However, in other embodiments, not shown, the functions preformed by the Interaction Manager 230, described in detail below, are implemented in software embedded in the Master Device 220. In addition, while in the embodiment illustrated in FIG. 2 the Unique ID Generator 232 and Profile Manager 234 are each separate devices, or software modules implemented on separate devices, the functions of these components, described below, may similarly be performed by software modules either executed on the Interaction Manager 230 existing as a separate device, or included in the software embedded in the Master Device 220.

Figure 3:
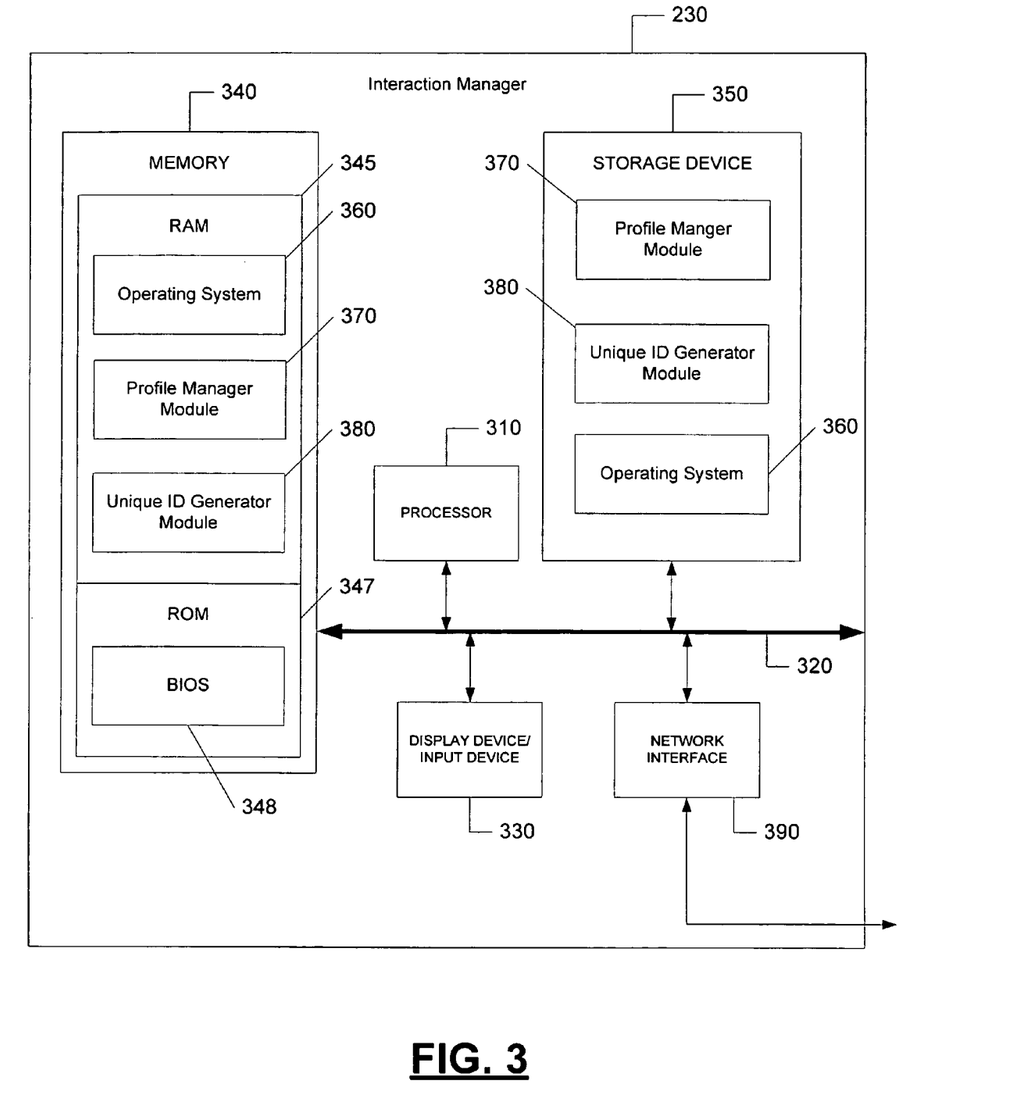
FIG. 3 is a block diagram of an Interaction Manager in accordance with one embodiment of the present invention.

FIG. 3 shows a schematic block diagram of an Interaction Manager 230 according to various embodiments of the present invention in which the Interaction Manager 230 is a separate device from the Master Device 220, and the functions of the Profile Manager 234 and Unique ID Generator 232 are performed by the Interaction Manager 230 and, in particular, by a Profile Manager Module 370 and Unique ID Generator Module 380, respectively. As shown, the Interaction Manager 230 includes a processor 310 that communicates with other elements within the Interaction Manager 230 via a system interface or bus 320. The processor 310 could be, for example, a central processing unit, microprocessor, microcontroller, programmable gate array, or some other device that processes data. Also included in the Interaction Manager 230 is a display device/input device 330 for receiving and displaying data. The unit 330 may include, for example, an input device such as a keyboard, mouse or pointing device, and a display device such as a monitor, cathode ray tube (CRT), liquid crystal display (LCD), or other such device. The Interaction Manager 230 further includes a memory 340, which includes both random access memory (RAM) 345 and read only memory (ROM) 347. The computer's ROM 347 may be used to store a basic input/output system 348 (BIOS), containing the basic routines that help to transfer information between elements within the Interaction Manager 230.

In addition, the Interaction Manager 230 includes at least one storage device 350, such as a hard disk drive, a floppy disk drive, a CD-ROM drive, or optical disk drive, for storing information on various computer-readable media, such as a hard disk, a removable magnetic disk, or a CD-ROM disk. As will be appreciated by one of ordinary skill in the art, each of these storage devices 350 is connected to the system bus 320 by an appropriate interface. The storage devices 350 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices 350 and within RAM 345. Such program modules include an operating system 360, the Profile Manager Module 370, and the Unique ID Generator Module 380. The Profile Manager Module 370 and the Unique ID Generator Module 380 control certain aspects of the operation of the Interaction Manager 230, as is described in more detail below, with the assistance of the processor 310 and the operating system 360.

Also located within the Interaction Manager 230 is a network interface 390, for interfacing and communicating with other elements of a computer network. It will be appreciated by one of ordinary skill in the art that one or more of the Interaction Manager 230 components may be located geographically remotely from other Interaction Manager 230 components. Furthermore, one or more of the components may be combined, and additional components performing functions described herein may be included in the Interaction Manager 230.

Figure 4:
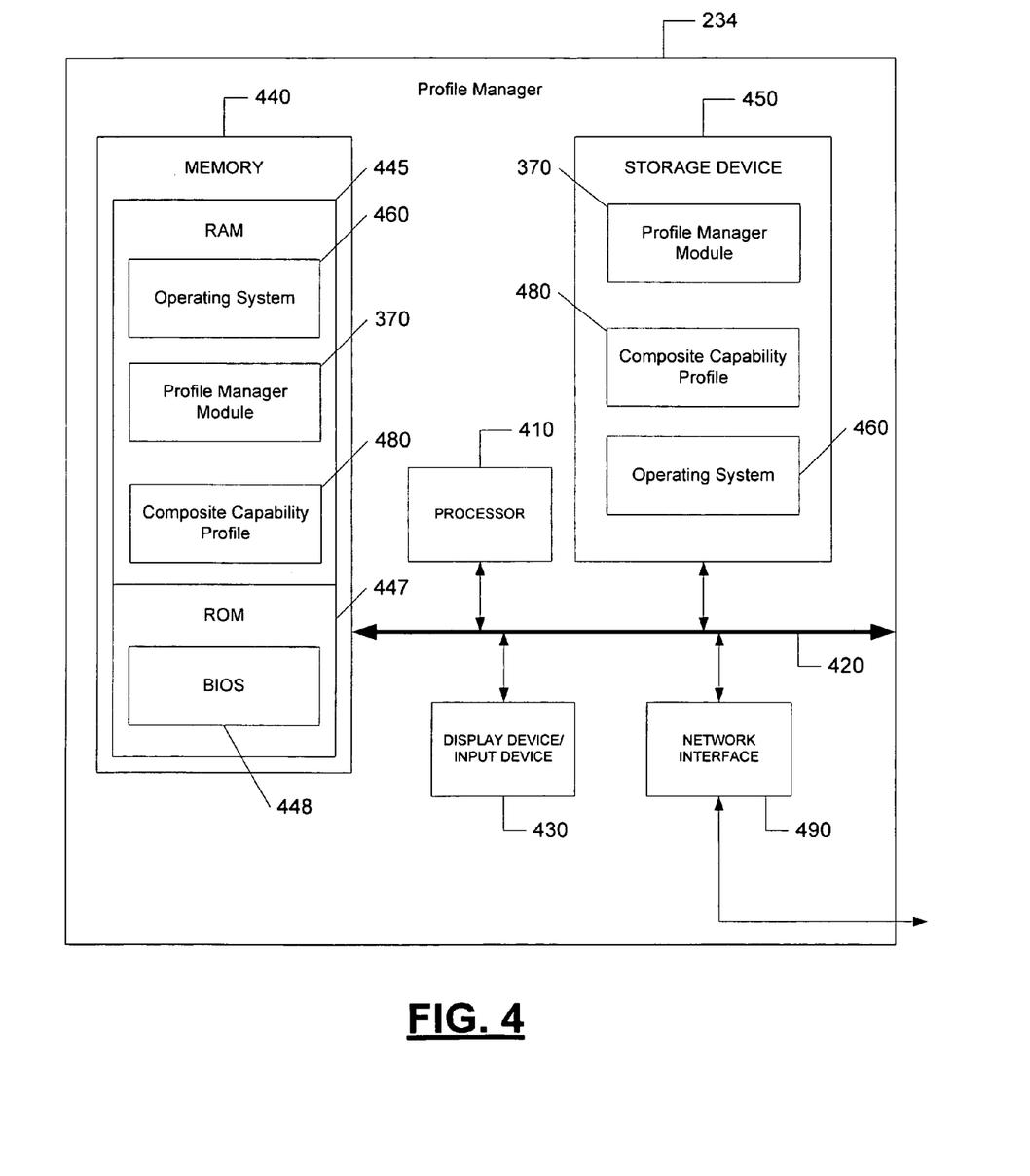
FIG. 4 is a block diagram of a Profile Manager in accordance with one embodiment of the present invention.

FIG. 4 shows a schematic block diagram of a Profile Manager 234 in accordance with various embodiments of the present invention, in which the Profile Manager 234 is a separate device from the Interaction Manager 230. The elements of the Profile Manager 234 shown in FIG. 4 are the same or similar to corresponding elements of the Interaction Manager 230 shown in FIG. 3, with a few exceptions. In particular, the Profile Manager 234 includes a processor 410 that communicates with other elements within the Profile Manager 234 via a system interface or bus 420, a display device/input device 430 for receiving and displaying data, a memory 440, which includes both random access memory (RAM) 445 and read only memory (ROM) 447, wherein the ROM 447 may be used to store a basic input/output system 448 (BIOS) and the RAM 445 may be used to store the Composite Capability Profile 480, described in detail below, at least one storage device 450, and a network interface 490, for interfacing and communicating with other elements of a computer network.

Like the Interaction Manager 230, a number of program modules may be stored by the various storage devices 450 and within RAM 445. Such program modules include an operating system 460, and the Profile Manager Module 370. The Profile Manager Module 370 controls certain aspects of the operation of the Profile Manager 234, as is described in more detail below, with the assistance of the processor 410 and the operating system 460.

Overall Process

Various embodiments of the present invention permit multiple devices operated by the same user to participate in a single session for processing a multimodal application using one or more modalities. Additionally, at least some embodiments permit a new device to participate in a previously established single session where the capabilities of the new device exceed that of any of the other devices participating in the session or the user's preferences dictate that the new device be allowed to join the session.

Figure 5:
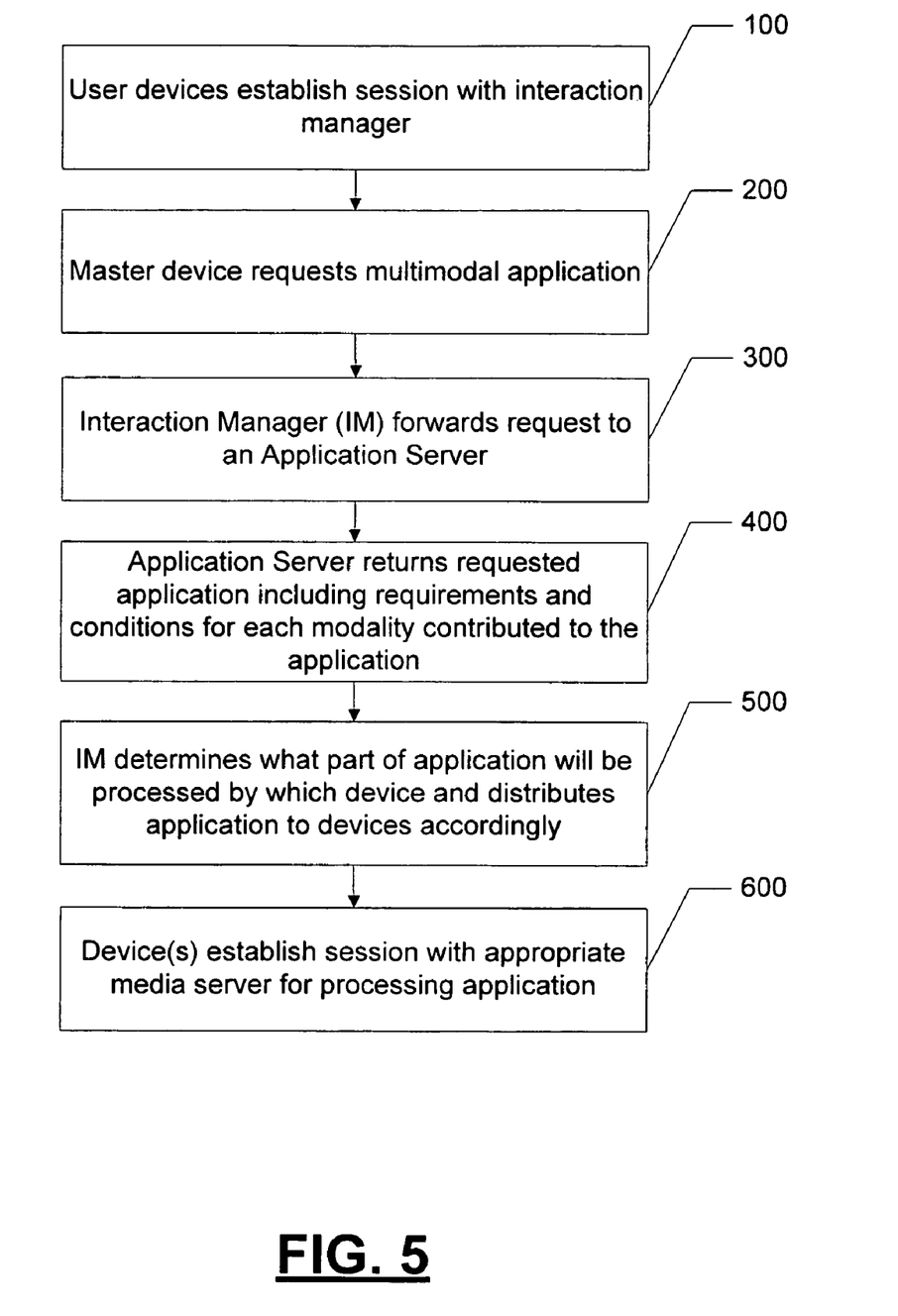
FIG. 5 is a flow chart illustrating an overall method of providing a session for processing a multimodal application with multiple devices according to embodiments of the present invention.

FIG. 5 provides a high level flow chart of the overall process for processing a multimodal application using multiple devices participating in one session. The process begins at Step 100 when one or more user devices establish a session with an Interaction Manager 230. As is explained in detail below with respect to FIG. 6, in one embodiment, establishing a session with an Interaction Manager 230 includes respective devices sending a request to establish a session, such as a Session Initiation Protocol (SIP) INVITE message, to the Interaction Manager 230 through use of, for example, a SIP URI (Universal Resource Identifier) identifying the Interaction Manager 230. In one embodiment, these requests are sent to the Interaction Manager 230 via the Session Component 250, which manages the sessions for the Interaction Manager 230.

The request sent by each device includes a multimodal profile associated with that device that includes a list of one or more capabilities of the device, a list of user preferences, and a unique user identification (ID) identifying the user of the device. An example of a user preference may include an indication of how much a user is willing to spend (e.g., for a network-based service, rather than a device-based service which is more limited) in terms of, for example, dollars per hour, in order to gain a certain level of quality in the processing of the application (i.e., cost versus quality). The unique user ID may be, for example, the user IPV6 (Internet Protocol v.6) address, or a user URI. Using the capabilities and preferences listed in the multimodal profiles of each device, as well as the unique user ID, the Interaction Manager 230 creates a session object including a Composite Capability Profile 480 for the session that catalogs these capabilities and preferences as well as a unique session ID.

Once the session is established, in Step 200, the Master Device 220, which can be any one of the user devices participating in the session, sends a request, which includes the unique session ID, to the Interaction Manager 230 for a multimodal application. In Step 300, the Interaction Manager 230 forwards this request to an Application Server 240 along with a description of the composite capabilities and preferences of the devices participating in the session. The Application Server returns the requested multimodal application that is best suited for the devices participating in the session, to the Interaction Manager 230 in Step 400.

Figure 7:
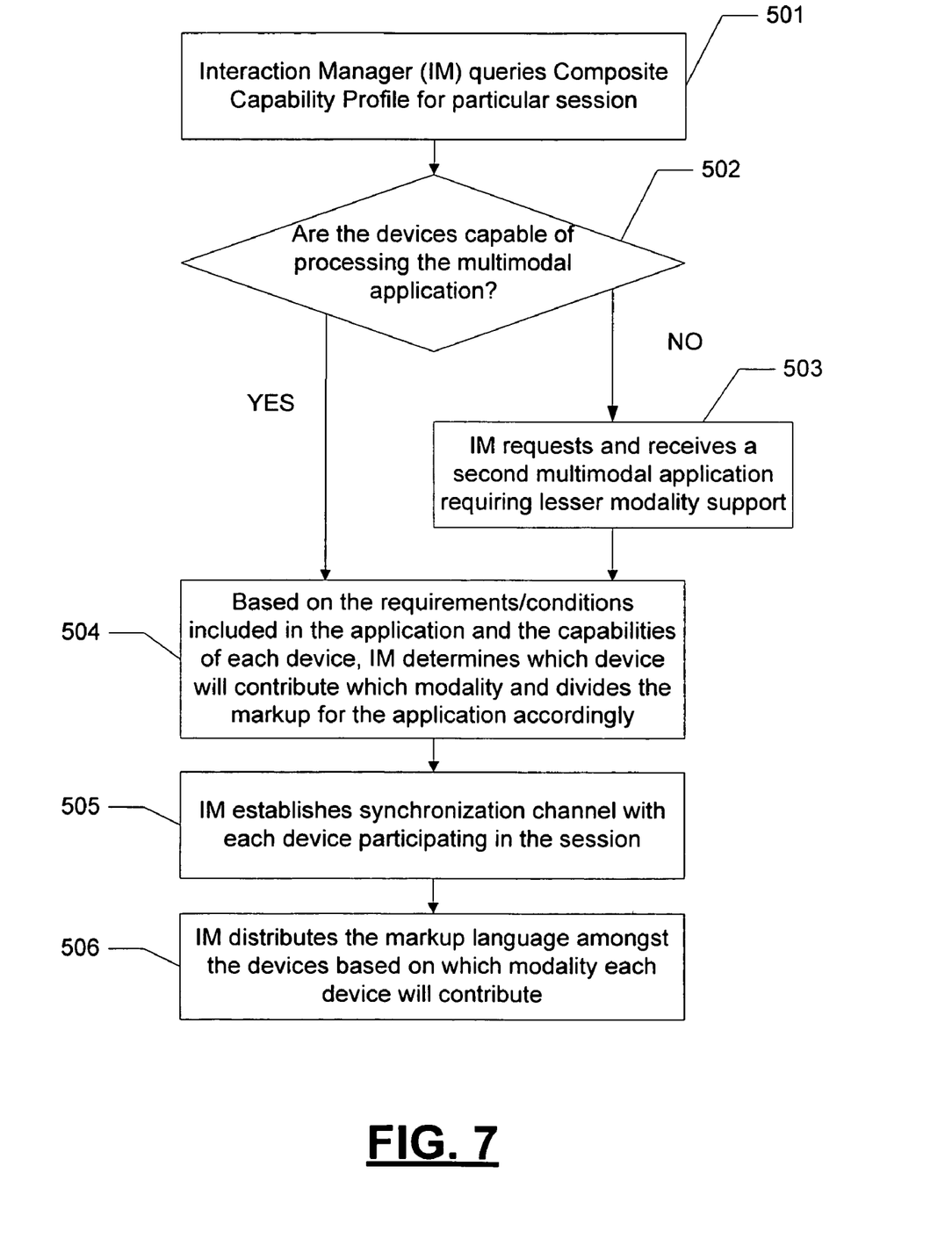
FIG. 7 is a flow chart illustrating a method of distributing a multimodal application to multiple devices participating in a single session for processing the multimodal application in accordance with one embodiment of the present invention.

As will be described in more detail below with respect to FIG. 7, the multimodal application provided by the Application Server 240 includes the application author's specification of one or more requirements and conditions for use of one or more modalities in association with the application. In other words, the application author will embed in the application markup language his or her preferences for modalities to use in association with the application, as well as the capabilities necessary for using those modalities in order to create an optimal interaction between devices. The author may even provide alternative markups for each modality depending upon the capabilities of the devices (e.g., the author may specify that if there is a speech recognizer available that can process X words, use a particular markup language; while, if there is a speech recognizer available that can process 1000X words, use a different markup language). The Interaction Manager 230, which acts as the management controller for the multimodal application, uses these requirements, along with the Composite Capability Profile 480, to determine what part of the application will be processed by which device participating in the session, and distributes the application accordingly (Step 500).

Finally, in Step 600, once each device knows what modality it will be using to process the application (i.e., each device knows of its support for the session), the device establishes a session with the Media Server 260 for processing the media portion of the application. For example, a device supporting a voice browser would setup a session with a Media Server for Automated Speech Recognition (ASR) services. The Media Server 260 in turn will listen for speech data from the user, convert the speech data into text, and send the converted text to the voice browser. The voice browser can then update its data fields with the text and forward the text on to the other devices participating in the session (e.g., a device supporting a vision browser). The Media Server 260 comprises one or more media processors for processing data received via various modes. For example, the Media Server 260 may have a media processor for converting speech to text, as described above, as well as a media processor for converting text to speech, which can be used, for example, for providing output to the user in the form of speech.

Establishing a Single Session

Figure 6:
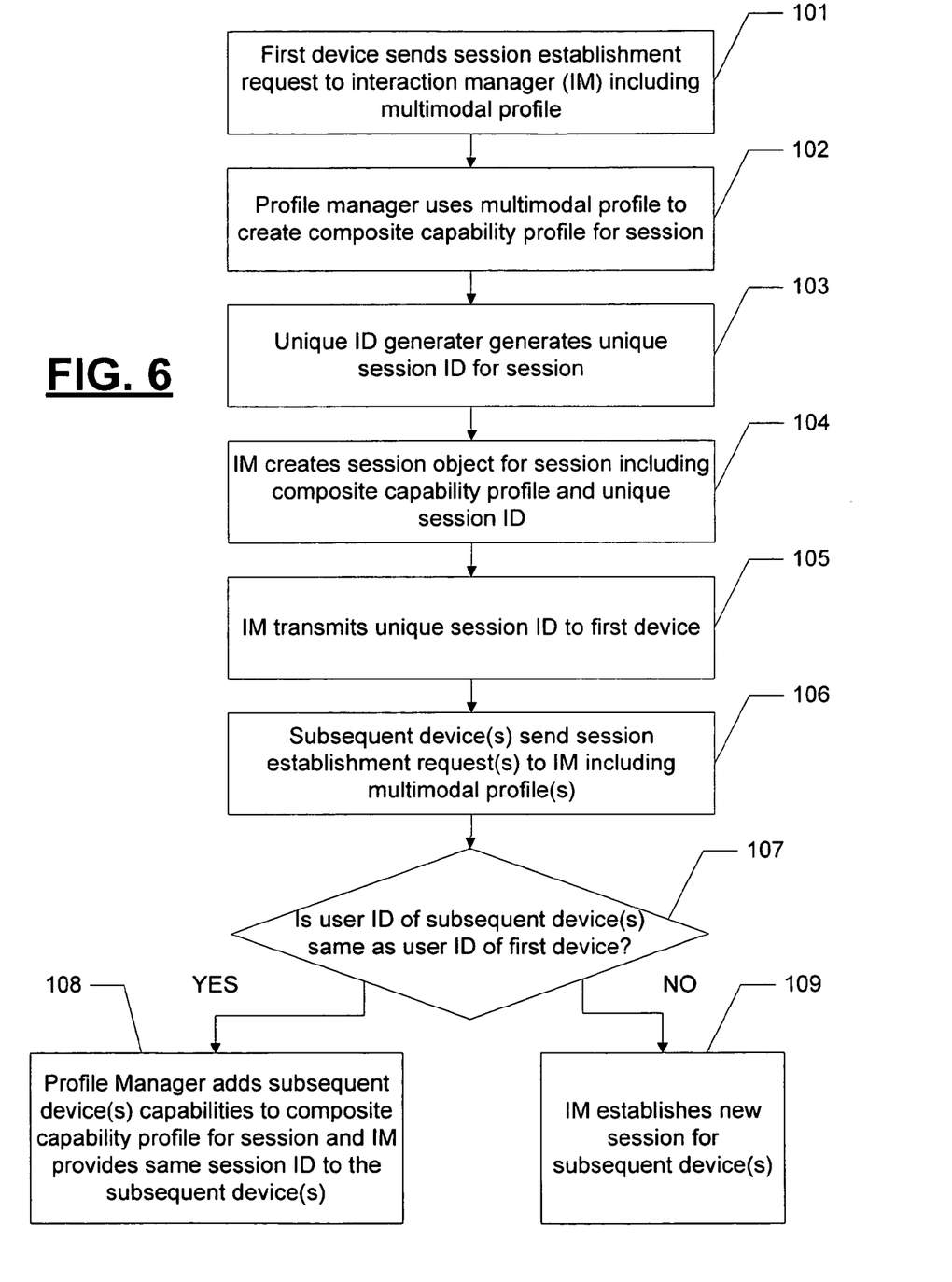
FIG. 6 is a flow chart illustrating a method of establishing a session for processing a multimodal application in accordance with embodiments of the present invention.

FIG. 6 is a flow chart illustrating the method for establishing a session for processing a multimodal application (Step 100 above) in accordance with embodiments of the present invention. As shown, in one embodiment, the method begins at Step 101 when a first device sends a session establishment request to the Interaction Manager 230 including a multimodal profile associated with the device. In one embodiment, the session establishment is a SIP INVITE message, wherein the multimodal profile is part of the message payload. Alternatively, the multimodal profile may be sent (either in response to a request from the Interaction Manager 230 or automatically) as a payload of another SIP message, such as INFO or MESSAGE, once the session is established.

As stated above, the multimodal profile includes a list of one or more capabilities associated with the device, such as the hardware, software, or modalities supported by the device (e.g., the size of the speech recognizer, if any, held by the device). The multimodal profile also includes a list of user preferences (e.g., cost versus quality for a particular modality) and a unique user ID identifying the user of the device. Where a user operates more than one device, the unique user ID of each device operated by that user will be the same.

Once the Interaction Manager 230, which, as stated above, may comprise a separate device connected to the Master Device 220 via the network 210, or may consist of software embedded in the Master Device 220 itself, receives the session establishment request, the Interaction Manager 230 forwards the multimodal profile associated with that device to the Profile Manager 234 and the Unique ID Generator 232. As stated above, in one embodiment, the Profile Manager 234 and Unique ID Generator 232 are separate devices in connection with the Interaction Manager 230 via the network 210. Alternatively, the functions of the Profile Manager 234 and the Unique ID Generator 232 may be performed by a Profile Manager Module 370 and a Unique ID Generator Module 380, respectively, within the Interaction Manager 230 or within the Master Device 220 itself (where the functions of the Interaction Manager 230 are also performed by software embedded in the Master Device 220).

In Step 102, the Profile Manager 234, or Profile Manager Module 370, uses the multimodal profile to create a Composite Capability Profile 480. The Composite Capability Profile 480 consists of a compilation of the capabilities and user preferences of all devices participating in the session. At this point, the Composite Capability Profile 480 includes only the capabilities and preferences listed in the multimodal profile of the first device. In Step 103, the Unique ID Generator 232, or Unique ID Generator Module 380, generates a unique session ID for the session being established. Using the Composite Capability Profile 480 and the unique session ID, the Interaction Manager 230 creates a session object for the session (Step 104), and transmits the unique session ID to the first device (Step 105). This unique session ID will be included in all messages relating to the established session sent from the device to the Interaction Manager 230.

In Step 106 one or more additional devices send a session establishment request to the Interaction Manager 230. In one embodiment, each request includes a multimodal profile including a list of one or more capabilities of the device with which it is associated, the user preferences, and a unique user ID. In one embodiment, the additional, or new, devices send the request to the Interaction Manager 230 automatically upon entering the vicinity of the other devices participating in the session. Alternatively, the Interaction Manager 230, or one of the devices participating in the session, may poll the devices in the vicinity, for example, at various intervals or upon a determination that a new device has entered the vicinity, and prompts the new device to send its multimodal profile to the Interaction Manager 230 if it wishes to join the session.

Using the unique user ID, in Step 107, the Interaction Manager 230 determines whether the subsequent device(s) is/are operated by the same user—i.e., is/are the unique user ID of the subsequent device(s) the same as that of the first? If the subsequent device(s) is/are operated by the same user, the Profile Manager 234 (or Profile Manager Module 370) adds the capabilities and user preferences of the subsequent device (s) (included in the multimodal profile of each device) to the Composite Capability Profile 480, and the Interaction Manager 230 provides the same session ID to the subsequent device(s) (Step 108). As above, the subsequent device(s) will use this session ID in all messages relating to the session sent to the Interaction Manager 230. Alternatively, if the subsequent device(s) is/are not operated by the same user, the Interaction Manager 230 will establish a new session for those devices (Step 109).

The Interaction Manager 230 can establish multiple sessions for processing various different multimodal applications with the same devices at the same time in the manner described above. For example, a user may want to browse several multimodal web sites at the same time using the same devices. In this case, a separate session would be established for each multimodal web site.

Distributing the Multimodal Application

Once the client devices have established a session with the Interaction Manager 230 for processing the multimodal application, the Master Device 220 requests the multimodal application from the Interaction Manager 230 (Step 200 above). In one embodiment, the Master Device 220 sends an HTTP (Hypertext Transfer Protocol) request to the Interaction Manager 230 including the unique session ID previously provided to the Master Device 220 by the Interaction Manager 230. As stated above, the Interaction Manager 230 forwards the request to an Application Server 240 along with the composite capabilities and user preferences of the devices participating in the session (Step 300 above). The Application Server 240 returns the requested multimodal application that is optimal, or is otherwise determined to be best suited, for the listed capabilities and preferences to the Interaction Manager 230 (Step 400 above). Within the multimodal application received by the Interaction Manager 230 the application author has specified the desired modalities, and capabilities for each modality, that would warrant the best interaction for processing that application. Specifically, the multimodal application includes markup language which specifies, among other things, one or more requirements and conditions for using each of one or more modalities in association with the application. For example, the author may specify that using speech recognition as an input/output mode would benefit from the use of a relatively large vocabulary grammar, or that the Text-to-Speech synthesis required for the application needs certain language support.

The Interaction Manager 230 determines, based on these requirements and conditions, as well as the capabilities and user preferences of each device, what part of the application will be processed by each device (i.e., which modality each device will contribute to the multimodal interaction) and distributes the application to the devices accordingly (Step 500 above). FIG. 7 illustrates the steps involved in making this determination and in distributing the application to the devices.

As shown, the Interaction Manager 230 first queries the Composite Capability Profile 480 created by the Profile Manager 234 for the established session in Step 501. As stated above, the Composite Capability Profile 480 is a compilation of the capabilities and user preferences of each of the devices participating in the session. As each device joined the session, the Profile Manager 234 added the capabilities and preferences of that device to the Composite Capability Profile 480.

By querying the Composite Capability Profile 480, the Interaction Manager 230 first determines whether or not the devices participating in the session are capable of supporting the modalities associated with the multimodal application received (Step 502). For instance, the application may specify that in order to process the application the author prefers that a voice recognizer capable of processing at least 10,000 words be used. If there are no devices participating in the session that have this capability, as can be determined based on the capabilities listed in the Composite Capability Profile 480, or the user preferences dictate that, for example, the cost of establishing a session with a Media Server 260 having these voice recognition capabilities exceeds the benefit, or improvement in the quality of the session, brought by the use of such a voice recognizer, the Interaction Manager 230 determines that the multimodal application received from the Application Server 240 is not optimal, and requests, and receives, a second multimodal application requiring lesser modality support (Step 503).

However, if the devices are capable of supporting (and willing to support) the multimodal application (or once the Interaction Manager 230 has received the second multimodal application requiring lesser modality support) the Interaction Manager 230, in Step 504, determines which device will contribute which modality to the processing of the multimodal application, and divides the markup language of the application accordingly. In particular, the multimodal application has been written so as to be comprised of different portions that are specifically catered to each modality, such that these different portions may be divided into one more modality markups, wherein each modality markup is associated with a different modality (e.g., speech, handwriting, or keystrokes) and further with a respective device. The determination of which device will contribute which modality (and therefore receive which modality markup) is based, at least in part on, the requirements for using each modality specified in the markup language of the application, as well as the capabilities and user preferences of each device listed in the Composite Capability Profile 480.

Finally, in Steps 505 and 506, respectively, the Interaction Manager 230 establishes a synchronization, or data, channel with each of the devices participating in the session and distributes the modality markups to the devices. Through synchronization messages over the synchronization channel the devices will be notified of the modalities to be supported and the expected markups. The Interaction Manager 230 also uses the synchronization channel to synchronize respective modalities throughout the session. Now that the session has been established and each device has been informed of the modality it will be contributing to the session, each device establishes a session with a Media Server 260 for processing the media portion of the application (Step 600 above).

Allowing New Device to Join Session

Figure 8:
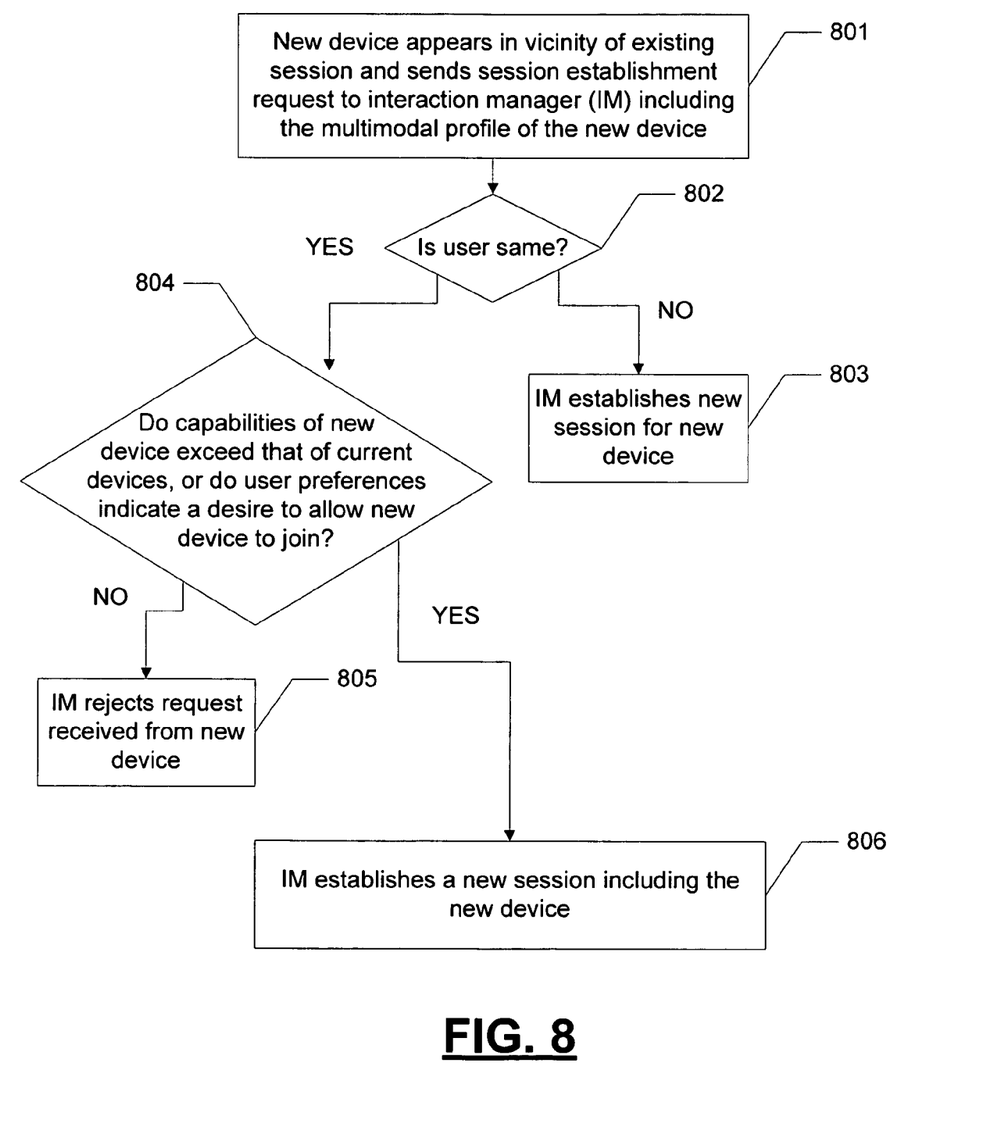
FIG. 8 is a flow chart illustrating a method of allowing a new device to join in a previously established single session for processing a multimodal application in accordance with one embodiment of the present invention.

Another aspect of the present invention, illustrated in FIG. 8, involves allowing a new device to enter into a previously established session for processing the multimodal application where the new device is operated by the same user and where either the new device has capabilities that exceed that of the current devices participating in the session, or the user preferences included in the multimodal profiles of the current and/or new devices dictate that the new device be allowed to join the session. As stated above, this may occur, for example, when a user that is browsing a multimodal web site while in his car using a PDA in conjunction with an electronic amulet having a voice recognizer enters his or her office where he or she has access to a network-based voice recognizer capable of processing many times the number of words as the voice recognizer of the electronic amulet. In this example, the current devices are the PDA and the amulet, while the new device is the network-based voice recognizer. The new device is operated by the same user and has capabilities that exceed that of any of the current devices.

As shown in FIG. 8, the process begins at Step 801 when the new device appears in the vicinity of the existing session and sends a session establishment request, such as a SIP INVITE message, to the Interaction Manager 230 including the multimodal profile associated with the new device. Alternatively, the Interaction Manager 230, or another device participating in the session, may have polled the new device requesting its multimodal profile upon the new device appearing in the vicinity of the existing session. As in the above instances, the multimodal profile of the new device includes a list of one or more capabilities associated with the new device, the user's preferences, and a unique user ID identifying the user of the new device. Upon receipt of the new device's multimodal profile, the Interaction Manager 230 determines, based on the unique user ID included in the multimodal profile, whether the new device is operated by the same user as the current devices participating in the session (Step 802). Where the user of the new device is not the same as that of the current devices, the Interaction Manager 230 establishes a new, separate session with the new device by the method described in connection with FIG. 6 (Step 803).

Alternatively, if the user is the same, the Interaction Manager 230 then determines whether or not the capabilities of the new device exceed that of the current devices participating in the session and/or the user preferences indicate a preference for the new device (Step 804). To do this, the Interaction Manager 230 looks at the capabilities and preferences of the new device listed in the device's multimodal profile, and compares them to the capabilities and preferences listed in the Composite Capability Profile 480 for the particular session. In one embodiment, the Interaction Manager 230 may also (or instead) query the user directly to determine whether to allow the new device to join. If the capabilities of the new device do not exceed that of the current devices, or the user preferences indicate that the user would prefer not to allow the new device to join, the Interaction Manager 230 rejects the request (Step 805).

If the capabilities of the new device do exceed that of the current devices, or the user preferences dictate that the new device be allowed to join, the Interaction Manager 230 establishes a new session including the new device (Step 806). Establishing a new session may include either terminating the existing session and establishing a new session with one or more of the current devices and the new device, or reconfiguring the existing session to include the new device. In the instance where the new device is replacing one or more of the current devices (e.g., where the new device has capabilities exceeding that of those current devices making those devices unnecessary), the Interaction Manager 230 must remove those current devices from the session and then redistribute the modality markups accordingly. In some instances, establishing a new session will further include requesting a new multimodal application requiring increased modality support from the Application Server 240.

Allowing a new device to enter into a previously established session where the new device has capabilities exceeding that of the current devices can be very beneficial to the user. For instance, in the example given above, where the user is browsing the multimodal web site using his PDA and electronic amulet, because the voice recognizer of the electronic amulet is only able to process a limited number of words, the modality markup distributed to the amulet would dictate that the application provide voice prompts to the user that in some way limit the responses the user gives in return. For example, consider a scenario where a user is filling out an online form for purchasing airline tickets from London to Paris. Where the electronic amulet provides the voice browser, the user would likely be specifically prompted to provide the origination and destination locations (e.g., "Please provide the location from which you are flying;" "Now, please provide the location to which you are flying.") However, where the network-based voice recognizer that is able to process countless more words is allowed to enter the session, and in essence replace the voice recognizer of the electronic amulet, the modality markup distributed to the network-based voice recognizer will dictate that the application provide less limiting prompts, thus allowing the user to use more natural-language type responses to the prompts. For example, in the scenario above, the user may be able to simply say "I am flying from London to Paris." Because the network-based voice recognizer is capable of processing more words, it will be able to understand this statement and convert it into the appropriate text to fill out the online form.

MODIFICATIONS AND ALTERNATIVE EMBODIMENTS

Many modifications and other embodiments of the invention will come to mind to one skilled in the art to which this invention pertains having the benefit of the teachings presented in the foregoing descriptions. Accordingly, it should be understood that the invention is not to be limited to the specific embodiments disclosed and that modifications and other embodiments are intended to be included within the scope of the appended exemplary inventive concepts. Although specific terms are employed herein, they are used in a generic and descriptive sense only and not for purposes of limitation.

That which is claimed:

1. A method comprising:
   receiving a request to establish a session for processing a multimodal application from each of one or more devices;
   determining whether said one or more devices are operated by a common user;
   determining to create a composite capability profile for the devices determined to be operated by said user, based at least in part on multimodal profiles associated with each of said one or more devices, said composite capability profile comprises capabilities of one or more of said one or more devices for each modality;
   determining to select, for each modality, a device from said one or more devices based on its capabilities;
   determining to generate a unique session identification (ID) for a single session; and
   determining to provide for transmission of said unique session ID to the selected devices,
   where said request to establish as session for processing the multimodal application includes a multimodal profile associated with the device from which the request was received, said multimodal profile including at least one or more capabilities of said device, and wherein determining whether said one or more devices are operated by said user comprises determining whether said unique user IDS is the same for each of said one or more devices.

2. The method of claim 1 further comprising the steps of:
   receiving the multimodal application in response to a request therefore, said multimodal application including one or more requirements for using one or more modalities in association with said application;
   determining which of said multiple devices participating in said single session will use each of said one or more modalities based at least in part on said one or more requirements included in said multimodal application and said composite capability profile; and
   determining to provide for the distribution of at least part of said multimodal application to said multiple devices based on the determination made in the previous step.

3. The method of claim 2, wherein said multimodal application comprises markup language for each of said one or more modalities, and wherein distributing at least part of said multimodal application to said multiple devices comprises determining to divide said multimodal application into one or more modality markups and determining to transmit each of said one or more modality markups to a respective one of said multiple devices.

4. The method of claim 2, wherein said one or more modalities used in association with said multimodal application includes speech recognition, handwriting, and keystrokes.

5. The method of claim 2, wherein one modality used in association with said multimodal application is speech recognition, and said one or more requirements for using said speech recognition in association with the multimodal application includes a specification of a required vocabulary grammar size.

6. The method of claim 2, wherein determining which of said multiple devices participating in said single session will use each of said one or more modalities further comprises:
  determining whether said one or more requirements for using said one or more modalities in association with said multimodal application are supported by said multiple devices; and
  in an instance in which one or more modalities are not supported, then determining to provide for transmission of a request for a second multimodal application requiring lesser modality support, and receiving said second multimodal application.

7. The method of claim 6, wherein determining to provide for the distribution of at least part of said multimodal application to said multiple devices comprises determining to provide for the distribution of at least part of said second multimodal application.

8. A method comprising:
  receiving a request for a multimodal application from one of multiple devices;
  receiving the multimodal application in response to the request, said multimodal application including one or more requirements for each of one or more modalities used in association with said multimodal application;
  determining which of said multiple devices is configured to use each of said one or more modalities in association with said multimodal application based at least in part on said one or more requirements and a composite capability profile associated with a single session for processing the multimodal application, wherein said composite capability profile comprises a compilation of one or more capabilities associated with each of said multiple devices including capabilities of one or more of the multiple devices for each modality;
  determining to select, for each modality, a device from the one or more devices based on its capabilities; and
  determining to provide for the distribution of at least part of said multimodal application to said multiple devices based on the selection.

9. The method of claim 8, wherein said multimodal application comprises markup language for each of said one or more modalities, and wherein determining to provide for the distribution of at least part of said multimodal application to said multiple devices includes determining to divide said markup language into one or more modality markups and determining to provide for the transmission of each of said one or more modality markups to a respective one of said multiple devices.

10. The method of claim 8, wherein said one or more modalities include speech recognition, handwriting and keystrokes.

11. The method of claim 8, wherein determining which of said multiple devices is configured to use each of said one or more modalities in association with said multimodal application further comprises:
  determining whether said one or more requirements for using said one or more modalities in association with said multimodal application are supported by said multiple devices; and
  in an instance in which said one or more modalities are not supported then determining to provide for the transmission of a request for a second multimodal application requiring lesser modality support, and receiving said second multimodal application.

12. The method of claim 11, wherein determining to provide for the distribution of at least part of said multimodal application to said multiple devices comprises determining to provide for the distribution of at least part of said second multimodal application.

13. A method comprising:
  receiving a request to establish a session for processing a multimodal application from a new device, wherein said request includes a multimodal profile associated with said new device, said multimodal profile including one or more capabilities of said new device;
  determining whether the new device is operated by a user that is the operator of one or more current devices in a previously established single session for processing a multimodal application;
  determining whether said new device should process the multimodal application based on said one or more capabilities of said new device, wherein the determination comprises determining whether said one or more capabilities of said new device exceed a composite capability profile of the previously established single session, wherein the composite capability profile is based on a combination of the one more capabilities of said one or more current devices for each modality;
  determining to establish a new session with said one or more current devices and said new device upon a determination that said new device is operated by said user and should process said multimodal application; and
  determining to select, for each modality, a device from the one or more devices based on its capabilities,
  wherein a multimodal profile is associated with each of said one more current devices, said multimodal profile including said one more capabilities of the current device with which the multimedia profile is associated and a unique user identification (ID) identifying said user as operator of said current device.

14. The method of claim 13 further comprising:
  determining to terminate said previously established single session.

15. The method of claim 13, wherein said multimodal profile associated with said new device further includes one or more user preferences associated with said new device, and wherein said multimodal profile associated with each of said one or more current devices further includes one or more user preferences associated with said current device.

16. The method of claim 15 further comprising:
  determining whether said user preferences associated with said new device provide an indication that said user would prefer to allow said new device to join said single session;
  determining whether said user preferences associated with said current devices provide an indication that said user would prefer to allow said new device to join said single session; and
  determining to establish a new session with said one or more current devices and said new device upon a determination that said new device is operated by said user and that said one or more user preferences of said new device or of said current devices provide an indication that said user would prefer to allow said new device to join said session.

17. The method of claim 13, wherein determining whether said new device is operated by said user comprises determining whether said unique user ID included in said multimodal profile of said new device is the same as the unique user ID included in the multimodal profiles of said current devices.

18. An apparatus comprising:
  at least one processor and at least one memory including computer program code, the at least one memory and the computer program code configured to, with the at least one processor, cause an apparatus to perform at least the following:
receive a request to establish a session from each of one or more devices operated by a common user, said request including a multimodal profile associated with the device from which the request was received, said multimodal profile including one or more capabilities of said device and a unique user identification (ID) identifying said common user as the user of said device;
determine to communicate with a profile manager, wherein said profile manager uses said multimodal profile of each of said one or more devices to create a composite capability profile for a single session being established, wherein the composite capability profile comprises capabilities of one or more of the one or more devices for each modality, and to select, for each modality, a device from the one or more devices based on its capabilities; and
determine to communicate with a unique identification (ID) generator, wherein said unique ID generator generates a unique session ID for the single session being established,
wherein said one or more capabilities are applied for using said one or more modalities in association with a multimodal application and said composite capability profile to determine which of said one or more devices should use each of said one or more modalities in processing said multimodal application.

19. The apparatus of claim 18, wherein the apparatus is further caused to:
determine to communicate with an application server, wherein said application server provides said apparatus with said multimodal application.

20. The apparatus of claim 18 wherein at least one of said one or more devices communicates with a media server, and wherein said device establishes a session with said media server in order to process said multimodal application using said modality with which it was assigned by said interaction manager.

21. The apparatus of claim 18, wherein said apparatus and said profile manager comprise one device.

22. The apparatus of claim 18, wherein said apparatus and said unique ID generator comprise one device.

23. An apparatus comprising:
at least one processor and at least one memory including computer program code, the at least one memory and the computer program code configured to, with the at least one processor, cause an apparatus to perform at least the following:
determine to establish a session with one or more devices determined to be operated by a user,
determine to create a composite capability profile for said session, said composite capability profile including a compilation of one or more capabilities of each of said one or more devices for each modality, wherein a multimedia profile is associated with each of said one or more devices, said multimedia profile including said one or more capabilities of said device associated with the multimedia profile and a unique user identification (ID) identifying said user of said device,
determine to select, for each modality, a device from the one or more devices based on its capabilities,
determine to create a unique session ID for said session,
determine to query said composite capability profile to determine whether said one or more devices are configured to process a multimodal application and which of said one or more devices should process each of one or more modalities associated with said multimodal application based on the selection,
determine to provide for distribution of at least part of said multimodal application to said one or more devices based on the selection, and
determine to use said unique user IDS to determine whether said one or more devices are operated by said user.

24. The apparatus of claim 23, wherein creating the composite capability profile further causes the apparatus to:
determine to create the composite capability profile based upon said multimodal profile of each of said one or more devices.

25. The apparatus of claim 23, wherein querying said composite capability profile to determine which of said one or more devices should process each of said one or more modalities associated with said multimodal application further causes the apparatus to:
determine to analyze one or more requirements for each of said one or more modalities included in said multimodal application; and
determine, based at least in part on said one or more capabilities for each of said one or more devices included in said composite capability profile, which of said one or more devices meets each of said one or more requirements.

26. The apparatus of claim 23, wherein determining to provide for the distribution of at least part of said multimodal application to said one or more devices further causes the apparatus to:
determine to divide said multimodal application into one or more modality markups; and
determine to provide for the transmission of each of said one or more modality markups to a respective one of said one or more devices.

27. The apparatus comprising:
at least one processor and at least one memory including computer program code, the at least one memory and the computer program code configured to, with the at least one processor, cause an apparatus to perform at least the following:
receive one or more multimodal profiles associated with said multiple devices, each of said multimodal profiles including one or more capabilities of the device with which the multimodal profile is associated and including one or more user preferences associated with the device with which the multimedia profile is associated;
determine to combine said one or more capabilities from each of said multimodal profiles to create a composite capability profile associated with a single session comprising capabilities of one or more of the multiple devices for each modality;
determine to combine said one or more user preferences from each of said multimodal profiles to include in said composite capability profile associated with the single session;
determine to provide for the storage of said composite capability profile; and
determine to select, for each modality, a device from the one or more devices based on its capabilities.

28. The apparatus of claim 27, wherein the apparatus is in communication with an interaction manager, said interaction manager configured to access said composite capability profile in order to determine which of said multiple devices will use each of one or more modalities to process said multimodal application.

29. A non-transitory computer readable-storage medium carrying one or more sequences of one or more instructions which, when executed by one or more processors, cause an apparatus to perform at least the following:
- receiving a request to establish a session for processing a multimodal application from each of one or more devices;
- determining whether said one or more devices are operated by a common user;
- determining to create a composite capability profile for the devices determined to be operated by said user, based at least in part on multimodal profiles associated with each of said one or more devices, wherein the composite capability profile comprises a compilation of one or more capabilities associated with each of said multiple devices for each modality;
- determining to select, for each modality, a device from the one or more devices based on its capabilities;
- determining to generate a unique session identification (ID) for said a single session; and
- determining to provide for the transmission of said unique session ID to the selected devices,
- wherein said request to establish a session for processing the multimodal application includes a multimodal profile associated with the device from which the request was received, said multimodal profile including one or more capabilities of said device and unique user identification (ID) identifying an operator of said user, and
- wherein creating a composite capability profile causes the apparatus to further perform determining to combine the capabilities included in the multimedia profile of said one or more devices determined to be operated by said user.

30. The non-transitory computer-readable storage medium of claim 29, wherein determining whether said one or more devices are operated by said user causes the apparatus to further perform:
- determining whether said unique user ID is the same for each of said one or more devices.

31. A non-transitory computer readable-storage medium carrying one or more sequences of one or more instructions which, when executed by one or more processors, cause an apparatus to perform at least the following:
- receiving a request for a multimodal application from one of multiple devices;
- receiving the multimodal application in response to the request, said multimodal application including one or more requirements for each of one or more modalities used in association with said multimodal application;
- determining which of said multiple devices is configured to use each of said one or more modalities in association with said multimodal application based at least in part on said one or more requirements and a composite capability profile associated with a single session, wherein said composite capability profile comprises a compilation of one or more capabilities associated with each of said multiple devices including capabilities of one or more of the multiple devices for each modality;
- determining to select, for each modality, a device from the one or more devices based on its capabilities, and
- determining to provide for the distribution of at least part of said multimodal application to said multiple devices based on the selection.

32. The non-transitory computer-readable storage medium of claim 31, wherein said multimodal application comprises markup language for each of said one or more modalities, and wherein determining to provide for the distribution of at least part of said multimodal application to said multiple devices causes the apparatus to further perform:
- determining to divide said markup language into one or more modality markups; and
- determining to provide for the transmission of each of said one or more modality markups to a respective one of said multiple devices.

33. The non-transitory computer-readable storage medium of claim 31, wherein said one or more modalities include speech recognition, handwriting and keystrokes.

34. A non-transitory computer readable-storage medium carrying one or more sequences of one or more instructions which, when executed by one or more processors, cause an apparatus to perform at least the following:
- receiving a request to establish a session for processing a multimodal application from a new device, wherein said request includes a multimodal profile associated with said new device, said multimodal profile including one or more capabilities of said new device;
- determining whether the new device is operated by a user that is the operator of one or more current devices in a previously established single session for processing a multimodal application;
- determining whether said new device should process the multimodal application based on said one or more capabilities of said new device, wherein the determination comprises determining whether said one or more capabilities of said new device exceed a composite capability profile of the previously established single session, wherein the composite capability profile is based on a combination of the one more capabilities of said one or more current devices for each modality;
- determining to establish a new session with said one or more current devices and said new device upon a determination that said new device is operated by said user and should process the multimodal application; and
- determining to select, for each modality, a device from the one or more devices based on its capabilities,
- wherein a multimodal profile is associated with each of said one or more current devices, said multimodal profile including said one more capabilities of the current device with which the multimedia profile is associated and a unique user identification (ID) identifying said user as operator of said current device.

35. The non-transitory computer-readable storage medium of claim 34, wherein the apparatus is caused to further perform:
- determining to terminate a previously established single session.

36. The non-transitory computer-readable storage medium of claim 34, wherein said multimodal profile associated with said new device further includes one or more user preferences associated with said new device, and wherein said multimodal profile associated with each of said one or more current devices further includes one or more user preferences associated with said current device.

37. The non-transitory computer-readable storage medium of claim 36, wherein said apparatus is caused to further perform:
- determining whether said user preferences associated with said new device provide an indication that said user would prefer to allow said new device to join said single session;
- determining whether said user preferences associated with said current devices provide an indication that said user would prefer to allow said new device to join said single session; and determining to establish a new session with said one or more current devices and said new device upon a determination that said new device is operated by said user and that said one or more user preferences of said new device or of said current devices provide an indication that said user would prefer to allow said new device to join said session.

38. The non-transitory computer-readable storage medium of claim 34, wherein said multimodal profile associated with said new device includes a unique user identification (ID) identifying an operator of said new device.

39. The non-transitory computer-readable storage medium of claim 38, wherein determining whether said new device is operated by said user causes the apparatus to further perform:
determining whether said unique user ID included in said multimodal profile of said new device is the same as the unique user ID included in the multimodal profiles of said current devices.

40. A method comprising:
determining to establish a single session with the multiple devices operated by a common user;
determining to create a composite capability profile based at least in part on multimodal profiles associated with each of the multiple devices, said composite capability profile comprises a compilation of one or more capabilities associated with each of the multiple devices for each modality;
determining to select, for each modality, a device from the one or more devices based on its capabilities;
determining to provide for the distribution of at least part of a multimodal application to the multiple devices based at least in part on the composite capability profile; and
determining to process the multimodal application using the multiple devices.

41. The method of claim 40, wherein establishing a single session further comprises:
determining whether said multiple devices are operated by said user;
determining to generate a unique session identification (ID) for said single session; and
determining to provide for the transmission of said unique session ID to those devices operated by said user.

42. The method of claim 40, wherein providing for the distribution of the multimodal application to the multiple devices further comprises:
determining to receive a multimodal application, wherein said multimodal application includes one or more requirements for using each of one or more modalities in association with said multimodal application;
determining to query said composite capability profile to determine which of said multiple devices is configured to use each of said one or more modalities in association with said multimodal application, based at least in part on said one or more requirements included in said multimodal application;
determining to divide said multimodal application into one or more modality markups, wherein each modality markup is associated with a respective one of said one or more modalities used in association with said multimodal application; and
determining to provide for the distribution of said one or more modality markups to said multiple devices based on a determination of which of said multiple devices is configured to use each of said one or more modalities in association with the multimodal application.

* * * * *